F. J. HURST.
CONDUIT BOX.
APPLICATION FILED OCT. 13, 1911.
1,069,877.
Patented Aug. 12, 1913.
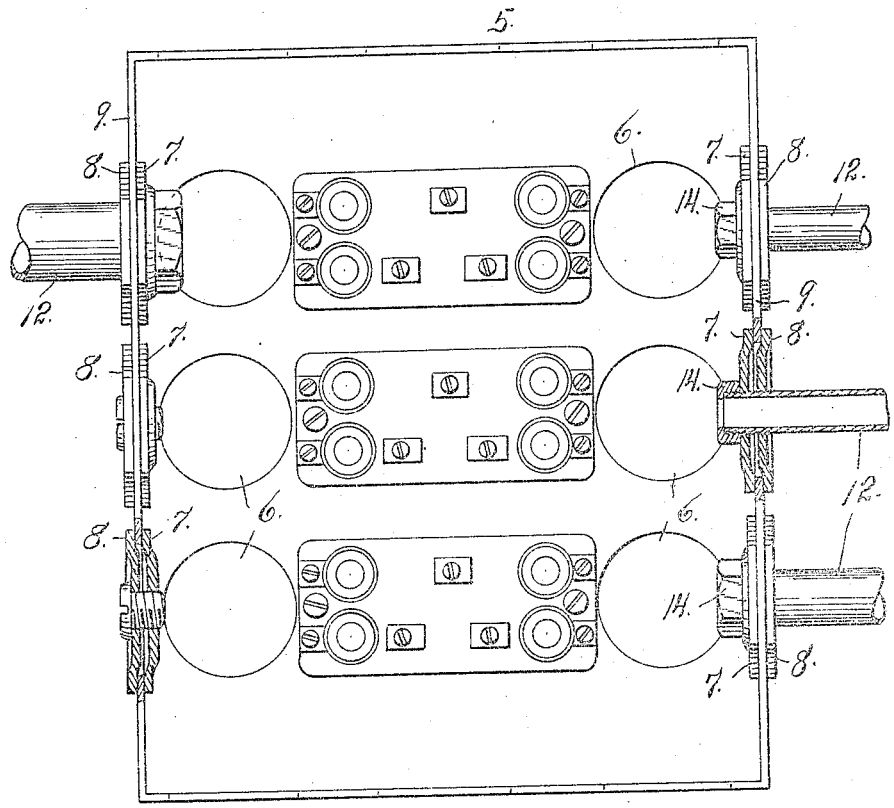
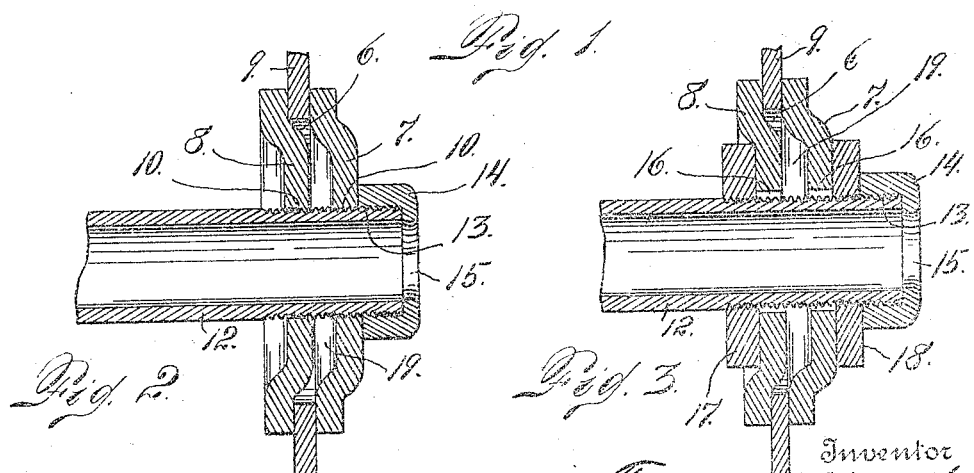
Witnesses
C. H. Rosener
Otto E. Waddick
Inventor
Francis J. Hurst
by
Attorney

UNITED STATES PATENT OFFICE.

FRANCIS J. HURST, OF DENVER, COLORADO.

CONDUIT-BOX.

1,069,877.  Specification of Letters Patent.  Patented Aug. 12, 1913.

Application filed October 13, 1911. Serial No. 654,493.

*To all whom it may concern:*

Be it known that I, FRANCIS J. HURST, a citizen of the United States, residing at the city and county of Denver and State of Colorado, have invented certain new and useful Improvements in Conduit-Boxes; and I do declare the following to be a full, clear, and exact description of the invention, such as will enable others skilled in the art to which it appertains to make and use the same, reference being had to the accompanying drawings, and to the characters of reference marked thereon, which form a part of this specification.

My invention relates to improvements in conduit boxes or boxes adapted for holding switches, cut-outs, fuse-blocks and all similar apparatus used in connection with electrical wiring.

The object of my improvement is to make it practicable to form the openings in boxes of this character of uniform size and adapted to receive the largest conduit, my improvement consisting in providing means whereby these openings may be reduced to conform to all sizes of conduits from the largest to the smallest. This is accomplished by applying plates to the opposite sides of the box where the openings are located, the said plates being suitably secured in place, either by screwing them upon the end of the conduit, which is threaded for the purpose, the plates being applied to the opposite sides of the box, or by applying the plates to the conduit, their openings being plain or unthreaded, and securing them by means of nuts. In either event, the invention is thoroughly efficient.

Having briefly outlined my improved construction, I will proceed to describe the same in detail, reference being made to the accompanying drawing, in which is illustrated an embodiment thereof.

In this drawing:—Figure 1 illustrates a conduit box with the cover removed, several of the openings being equipped with my improvement. Fig. 2 is a fragmentary sectional detail view, illustrating the improvement shown on a larger scale. Fig. 3 is a similar view, showing a slightly modified form of construction.

The same reference characters indicate the same parts in all the views.

Let the numeral 5 designate a conduit box, adapted to contain any of the ordinary conduits or conductors employed in connection with electrical wiring. The openings 6 of this box are made of uniform size, and are large enough to receive conduits of maximum size.

My improvement consists in applying plates 7 and 8 to the opposite sides of the box, where the openings 6 are located, the plates being large enough to overlap the wall 9 of the box around the said openings, the openings 10 in the plates being of such size as to conform to the size of the conduit 12 to be connected with the box. As illustrated in Fig. 2, these plates 7 and 8 are threaded to screw upon the threaded end 13 of the conduit, one of the plates being applied to the box on each side and tightened by screwing them to the proper position. Beyond the outermost plate 7 a tin bushing 14 is screwed upon the conduit, the said bushing having an opening 15 through which the wires, carried by the conduit, may pass to the interior of the box.

In the form of construction shown in Fig. 3, the plates 7 and 8 have plain or unthreaded openings 16, but are applied to the wall 9 of the box in the same manner,—that is to say, the outer edges of the plates overlap the wall around the opening 6. In this form of construction, the two plates are locked in place by means of nuts 17 and 18, the nuts 17 being applied to the outer surface of the plate 8, while the nut 16 is applied to the inner surface of the plate 7, whereby the two plates are securely clamped to the box. Beyond the nut 16, the tin bushing 14 is applied.

The plates 7 and 8 are preferably offset inwardly, whereby the portion of the plate 8 conforming to the opening 6 of the box enters the said opening, either wholly or partially filling the same, while the plate 7 is offset in the same direction, normally leaving a space 19 between the two plates. This offset feature makes it practicable to clamp the plates more tightly in position, and also prevents the possible shifting of the plates upon the wall of the box, since the offset part of the plate 8, extending into the opening 6, prevents lateral movement.

It will be understood that, in view of the fact that the plates 7 and 8 are slightly flexible, and in view of the space 19 separating the two plates 7 and 8, the inner portion of the plate 7 will yield more or less to the force applied in screwing the same upon the conduit, as shown in Fig. 2, and in clamping the same thereon by means of a nut 16, as shown in Fig. 3, thus securing the outer edges of the plate 7 so tightly to the wall of the box that the joint is practically sealed against the possible entrance of moisture or foreign matter or substances of any kind.

From the foregoing description, the advantages of my improvement will be readily understood. Heretofore, so far as I am aware, it has been necessary to make the openings in boxes of this character conform in size to the various sizes of conduits employed therewith. By the use of my improved construction, it becomes practicable to make the openings in all boxes of uniform size, viz.,—of the maximum size required for the largest conduit. When this is done by the use of my improvement, these openings may be reduced to conform to the sizes of the various conduits without any change whatever in the body of the box.

Having thus described my invention, what I claim is:—

The combination with a box having relatively large openings to receive conduits for holding electrical conductors, reducing plates applied to the opposite surfaces of the box around the openings, the central portions of said plates being in planes parallel with but offset from the rims thereof, the offset portion of the outer plate extending inwardly to enter the box openings, and the offset portion of the inner plate extending in the same direction, and suitable means for securing the plates in place, for the purpose set forth.

In testimony whereof I affix my signature in presence of two witnesses.

FRANCIS J. HURST.

Witnesses:
F. E. BOWERS,
A. EBERT O'BRIEN.